United States Patent
Mangin (10) Patent No.: US 10,601,733 B2
(45) Date of Patent: Mar. 24, 2020

(54) MULTIPLEXING METHOD FOR SCHEDULED FRAMES IN AN ETHERNET SWITCH

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/064,361

(22) PCT Filed: Jan. 25, 2017

(86) PCT No.: PCT/JP2017/003498
§ 371 (c)(1),
(2) Date: Jun. 20, 2018

(87) PCT Pub. No.: WO2017/154418
PCT Pub. Date: Sep. 14, 2017

(65) Prior Publication Data
US 2019/0007344 A1    Jan. 3, 2019

(30) Foreign Application Priority Data

Mar. 9, 2016   (EP) .................................. 16305268

(51) Int. Cl.
*H04L 12/931*      (2013.01)
*H04L 12/875*      (2013.01)
(Continued)

(52) U.S. Cl.
CPC ............ *H04L 49/351* (2013.01); *H04L 47/31* (2013.01); *H04L 47/56* (2013.01); *H04L 47/58* (2013.01);
(Continued)

(58) Field of Classification Search
CPC .............. H04L 49/351; H04L 49/9047; H04L 47/6215; H04L 47/31; H04L 47/58; H04L 47/56; H04L 47/6275
See application file for complete search history.

(56) References Cited

U.S. PATENT DOCUMENTS

| | | |
|---|---|---|
| 7,631,096 B1 | 12/2009 | Yeh et al. |
| 2003/0046414 A1 | 3/2003 | Pettyjohn et al. |
| 2014/0071823 A1 | 3/2014 | Pannell |

FOREIGN PATENT DOCUMENTS

KR    10 2005-0047303        5/2005

OTHER PUBLICATIONS

Notification of Reason for Refusal received in corresponding Korean Application No. 10-2018-7024759 dated Oct. 21, 2019 with English Translation.

*Primary Examiner* — Walter J Divito
(74) *Attorney, Agent, or Firm* — Birch, Stewart, Kolasch & Birch, LLP (57) ABSTRACT

The method comprises the steps of: a) providing a plurality of memory buffers, associated to respective indexes of priority, each buffer comprising one queue of frames having a same index of priority, b) sorting the received frames in a chosen buffer according to their index of priority, c) in each buffer, sorting the frames according to their respective timestamps, for ordering the queue of frames in each buffer from the earliest received frame on top of the queue to the latest received frame at the bottom of the queue, and d) feeding the transmitting ports with each frame or block of frame to transmit, in an order determined according to the index of priority of the frame, as well as an order of the frame or of the block of frame in the queue associated to the index of priority of the frame.

11 Claims, 7 Drawing Sheets

(51) Int. Cl.
*H04L 12/869* (2013.01)
*H04L 12/865* (2013.01)
*H04L 12/863* (2013.01)
*H04L 12/861* (2013.01)
*H04L 12/833* (2013.01)

(52) U.S. Cl.
CPC ...... *H04L 47/6215* (2013.01); *H04L 47/6275* (2013.01); *H04L 49/9047* (2013.01)

MULTIPLEXING METHOD FOR SCHEDULED FRAMES IN AN ETHERNET SWITCH

TECHNICAL FIELD

The present invention relates to packet-switched networks, such as Ethernet.

BACKGROUND ART

Until recently Ethernet switching has been based on simple multiplexing techniques without traffic shaping features, such as FIFO queues and forwarding priorities.

With the IEEE 802.1Qav standard (FQTSS for "Forwarding and Queuing for Time-Sensitive Streams"), which is part of the "Ethernet AVB" standard suite, per class traffic shaping has been introduced to handle rate constrained traffic.

With Ethernet TSN (Time Sensitive Networking), another traffic shaping scheme has been added for the support of scheduled traffics: 802.1Qbv (Enhancements for scheduled traffic). This multiplexing mechanism organises the transmission multiplex of a switch output port in time windows reserved for different traffic classes. This makes possible the accurate definition of time intervals (absolute starting and ending times of the interval) that are reserved at particular positions in time for the transmission of frames which can suffer only a tightly bounded transmission latency.

Standard 802.1Qbv is intended for bridges or switches to support transmission from queues that are scheduled relative to a known timescale. This timescale is shared by all the nodes (switches) belonging to the domain supporting scheduled traffics. Timing and synchronisation information is distributed using a specific protocol such as PTP (Precision Time Protocol, IEEEP1558) or gPTP (generalised PTP, IEEE 802.1AS).

Figure 1:
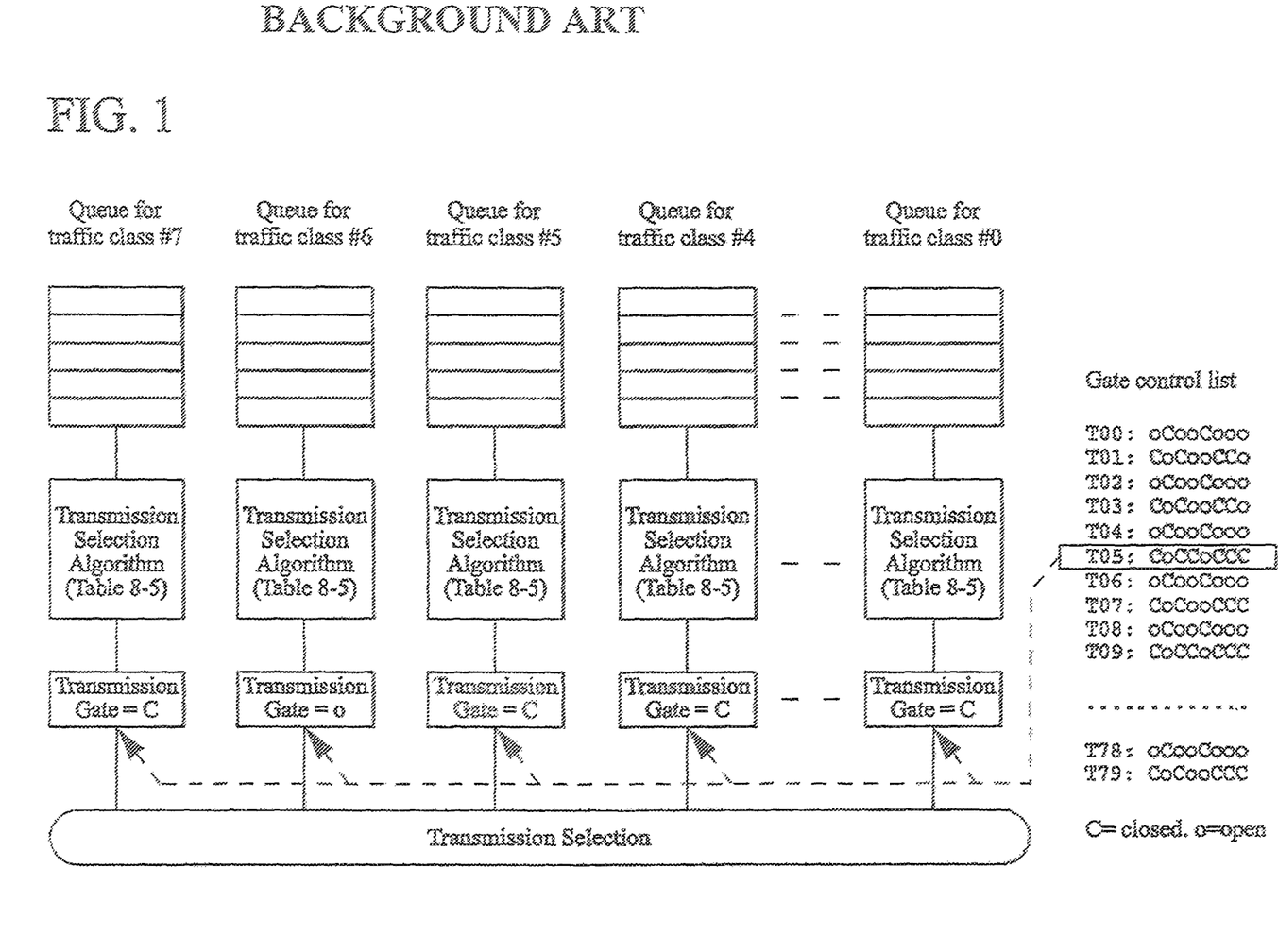
FIG. 1 shows a transmission selection with gates as proposed in standard 802.1Qbv.

As shown in FIG. 1, a transmission gate is associated with each queue: the state of the gate (C; o) indicates if queued frames can be selected for transmission.

For a given queue, the gate can be in one of two states:
Open (o): queued frames can be transmitted according to the transmission selection mechanism associated with the queue, and
Closed (C): queued frames are not selected for transmission.

The queues are located in a given port with which a gate control list is associated. The gate control list contains an ordered list of gate operations. Each gate operation changes the transmission gate state.

A state machine controls the execution of the gate control list.

A frame of a transmission class queue cannot be transmitted if the associated transmission gate is in the Closed state or if there is insufficient time to transmit the entire frame before the next gate-close event.

IEEE 802.1Qbv provides means for accurately reserving time intervals on the transmission link of a switch transmission port. These time intervals are dedicated for scheduled frames of given traffic classes.

SUMMARY OF INVENTION

Technical Problem

However if scheduled frames belonging to the same traffic class enter the switch from different reception ports, and are to be multiplexed within the same time window on the target transmission port, there is no provision for a mechanism that can define the multiplexing rules in the transmission port time windows.

Solution to Problem

The present invention aims to improve the situation.

At this end, the invention aims at a method for multiplexing data frames, in a packet-switched type network. At least a part of said network (typically a sub-network) comprises one or several switches having:
- a first plurality of receiving ports, receiving said data frames, and
- a second plurality of transmitting ports, for transmitting at least blocks of said data frames.

Each frame includes a data field comprising information related to an index of priority for transmitting the frame.

More particularly, a clock is provided to said switches so as to apply a timestamp of reception of each frame in each receiving port, and a memory medium is further provided so as to store transitorily each received frame along with its timestamp.

The method comprises then the steps of:
a) providing a plurality of memory buffers, associated to respective indexes of priority, each buffer comprising one queue of frames having a same index of priority,
b) sorting the received frames in a chosen buffer according to their index of priority,
c) in each buffer, sorting the frames according to their respective timestamps, for ordering the queue of frames in each buffer from the earliest received frame on top of the queue to the latest received frame at the bottom of the queue, and
d) feeding the transmitting ports with each frame or block of frame to transmit, in an order determined according to the index of priority of the frame, as well as an order of the frame or of the block of frame in the queue associated to the index of priority of the frame.

The method of the invention can be convenient (but not necessary limited to) an Ethernet network according to a standard of the type of IEEE 802.1Qbv.

Advantageously, under such circumstances:
- each queue can be related to an associated traffic class in a multiplex of switch transmission ports,
- then, assigned time windows are reserved for transmission of frames or blocks of respective traffic classes, and more particularly, within a same transmission time window, priority for transmission is given to a frame or block received at first in a reception port.

To that end, the provided clock can be further used in the transmitting ports so as to control timing of transmission operations within the aforesaid time windows.

Moreover, the wording "blocks of frames" refers to a possible embodiment where those blocks result from a predetermined fragmentation of a given frame so as to transmit each block separately, as provided in standard IEEE 802.3br (Interspersing Express Traffic). More details of a particularly advantageous embodiment of such a fragmentation are given in document EP 15305221.2 in the name of the applicant.

In an embodiment, steps a) to c) can be carried out for each transmitting port, and in step d), a given transmitting port is fed with successive frames or blocks of frame to transmit, in an order determined therefore according to the index of priority of the frame for the given transmitting port, but also according to an order of the frame or of the block of frame in the queue associated to the index of priority of the frame.

In an embodiment, frames or blocks of a given buffer associated to a given priority index are transmitted when the transmission of all the buffers associated to priority indexes which are higher than the given index is completed.

In that embodiment, each buffer can be emptied, for example, after transmission of the frames or blocks it contains, and each buffer can have a maximum length for storing a predetermined maximum number of frames.

That embodiment makes it possible to give priority to a predetermined number of frames of the highest priority buffers (that number corresponding to the buffer length).

Furthermore, in that embodiment, preferably, in step d):
d1) all the frames and/or blocks of frames of a same given buffer are successively transmitted at once,
d2) then, all the frames and/or blocks of frames of buffers associated to lower priority indexes are successively transmitted,
d3) then, the content of each buffer is replaced by newly received frames or blocks of frames.

In that embodiment, a temporary memory can be used for storing newly received frames during transmission steps d1) and d2) of previous frames or blocks. That memory can be part of the aforesaid provided memory medium.

However, in an alternative embodiment, a memory buffer can be provided in the memory medium simply so as to check the frames received from the reception ports (for reading the frames, checking their CRC, reading the priority index). Then, when the validity of the frame is confirmed, in that variant embodiment, the frame can be sent directly to the buffers of the transmitting ports without any further process. Therefore, in that case, there is no management of the transmission buffers lengths (which are deemed to be long enough for avoiding any overload).

Moreover, and more generally, the aforesaid memory medium and the buffers for the transmission ports can be in the form of two separated memory blocks, or can alternatively be part of a same hardware memory unit (such as in the "cut-through mode" described below).

The present invention aims also at a network system (or a sub-network system) comprising several receiving ports and several transmitting ports, comprising a clock counter, a memory medium and a network processing device for performing the method according to the invention. An example of such a system is shown on FIG. 3.

The invention aims also at a network processing device (as shown as for an example on FIG. 8) for performing the method of the invention and comprising:
 an input interface to receive frames received over several receiving ports,
 a processing circuit receiving a clock input so as to apply a timestamp to each received frame,
 a link with a memory cooperating with the processing circuit so as to store transitorily each frame in a buffer corresponding to an index of priory of transmission of that frame, and in an order in the buffer corresponding to the timestamp of that frame, and
 an output interface to feed a transmitting port with a frame or block of frame for a transmission at a moment depending on the buffer that said frame or block of frame belongs to, and on the position of said frame or block of frame in the buffer.

The present invention aims also at a computer program product (or at a non-transitory medium storing such a computer program product), comprising instructions for performing the method of the invention, when run by a processor. A possible algorithm of such a computer program can be represented by the flow chart shown as an example of embodiment on FIG. 9.

The present invention is illustrated by way of example, and not by way of limitation, in the figures of the accompanying drawings, in which like reference numerals refer to similar elements.

DESCRIPTION OF EMBODIMENTS

The present invention proposes a mechanism that takes advantage of the existence of a reference clock that is common to all the nodes in a considered network or sub-network. This clock is available in the receiving and transmitting ports of the switches. In the receiving ports, the clock is used to timestamp the incoming frames, i.e. to associate with each received frame the time when its first bit is received. In the transmitting port, it is used to control the timing of the 802.1Qbv transmission gates operation.

The transmission order of the scheduled frames belonging to the same Traffic Class within the associated time window is defined by the order of their respective timestamps given by the clock. The frame timestamps are sorted in increasing order. Thus the frames belonging to the same Class are transmitted in the increasing order of their arrival time on the different Reception ports, as shown in FIG. 2.

Successive frames f11, f12, f13 are received in a first reception port "Rx port 1", while other successive frames f21, f22, f23 and f31, f32, f33 are received by other reception ports, respectively "Rx port 2" and "Rx port 3".

Figure 2:
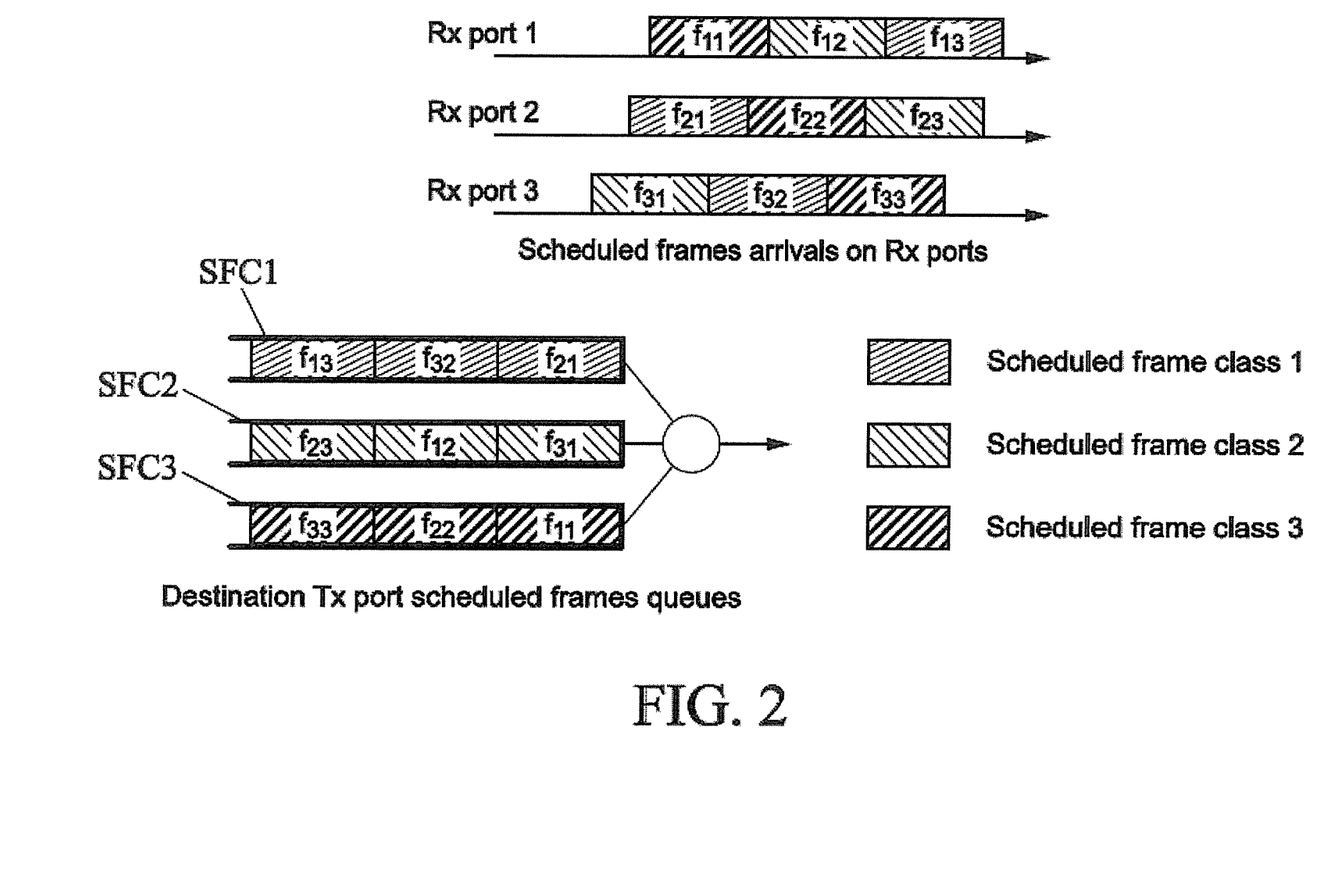
FIG. 2 shows an example of frame transmission ordering in a transmission port of a device according to the invention.

In the explanatory example of FIG. 2, each frame is intended to be transmitted by a same transmission port "Tx port".

Moreover, each frame is labelled as belonging to a particular traffic class: each frame comprises a data field comprising an index of priority for transmission (i.e. an index of traffic class). Each frame, at its reception, is assigned with a reception timestamp and is read so as to determine:
 its traffic class, and
 the transmission port which is intended to transmit that frame.

Then, each frame is stored in a particular buffer, SFC1, SFC2, SFC3, according to its traffic class: each buffer is then related to a corresponding scheduled frame class. However, in each buffer, the frames are ordered according to their timestamps. Therefore, for example for the first class frames SFC1, frame f21 has been received at first: then it will be the first frame of that buffer which will be transmitted, then the second one is f32, and then f13. Then, transmission port "Tx port" will transmit all the frames of the buffer SFC1, then all the frames of the buffer SFC2, etc.

This mechanism guarantees that, within the same Traffic Class, the frames experience the least latency due to multiplexing, and then enforces the low-latency nature of the scheduled traffics.

Figure 3:
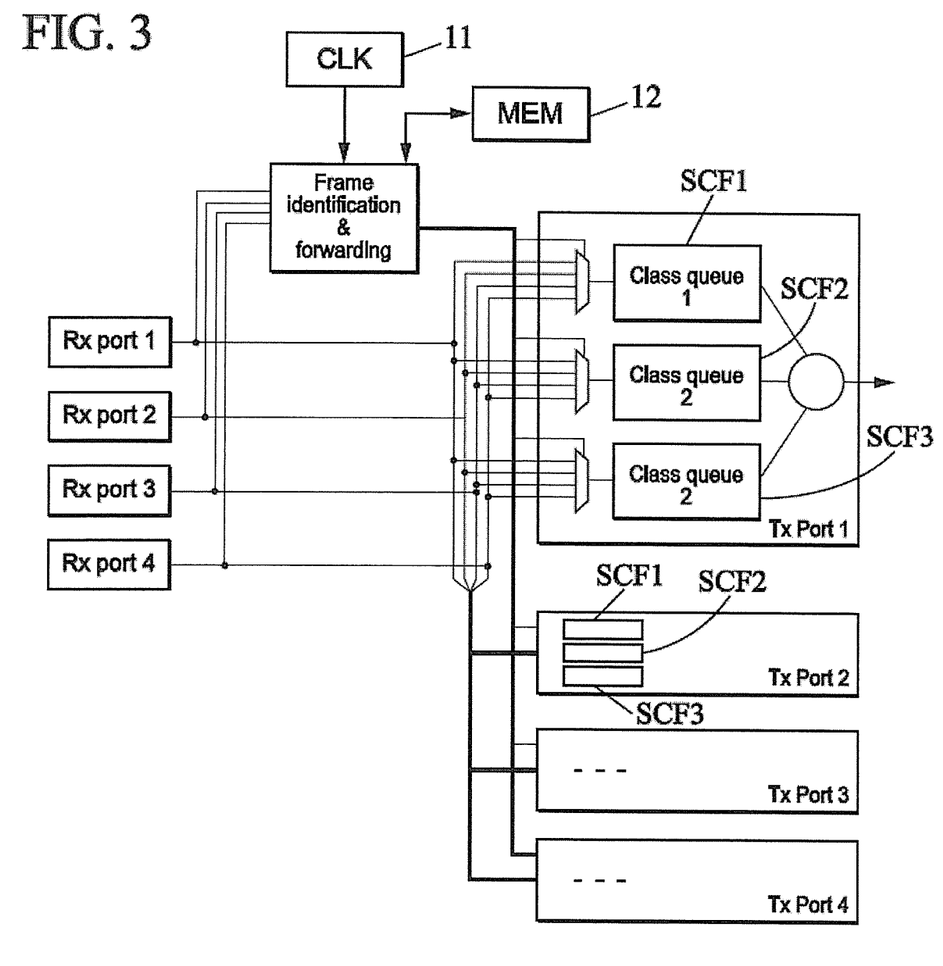
FIG. 3 shows a network system having a generic four ports switch architecture as an explanatory example of embodiment of the invention.

FIG. 3 shows an example of a switch architecture with four ports in the shown example. More particularly, the proposed mechanism can be implemented in a switch, based on a generic data path as shown in FIG. 3. A frame identification and forwarding module 10 cooperates or includes a clock 11 so as to assign timestamps to each received frame over the Rx ports 1 to 4. The module 10 cooperates or includes a memory medium 12 comprising:
- a non-transitory memory section for storing non-transitorily instructions of a computer program according to an aspect of the present invention,
- as well as a transitory memory section for storing transitorily the received frames with their respective timestamps.

The memory medium 12 can cooperate or include memory buffers SFC1, SFC2, SFC3, of each transmitting port Tx Port 1 to 4, for storing temporarily queues of frames in each buffer, the frames in each buffer being ordered according to their timestamps (from the earliest received frame on top of the queue, until the latest received frame at the bottom of the queue).

The transitory memory section of memory 12 can be distinct from the buffers (so as to organize the recording of the frames with their timestamps before sending them to the buffers) or can simply correspond to the buffers themselves (for each transmitting port).

Figure 8:
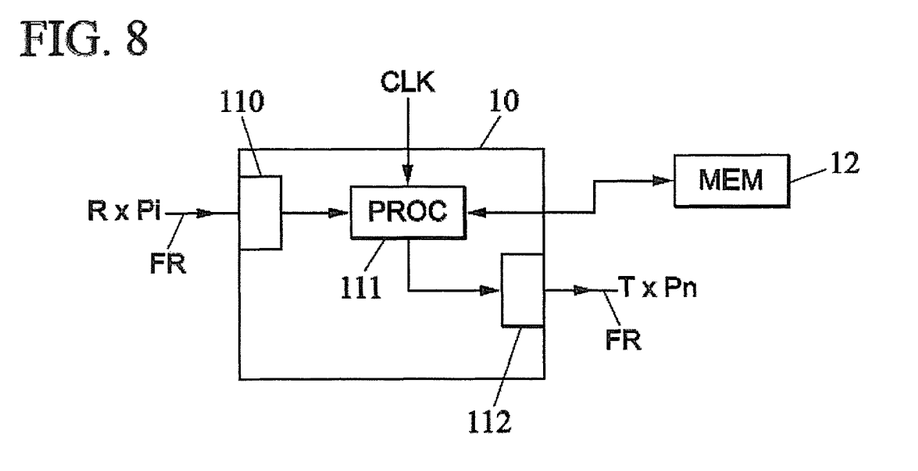
FIG. 8 shows a network processing device comprising elements for performing the method according to an embodiment of the invention.

Referring to FIG. 8, the frame identification and forwarding module 10 can be implemented as a processing network device for performing the method of the invention, and comprising:
- an input interface 110 to receive frames FR received over several receiving ports RxPi,
- a processing circuit 111 receiving a clock input CLK so as to apply a timestamp to each received frame,
- a link with the memory 12 cooperating with the processing circuit so as to store transitorily each frame in a buffer corresponding to an index of priory of transmission of that frame (for example the aforesaid frame class), and in an order in the buffer corresponding to the timestamp of that frame (as shown in the example of FIG. 2), and
- an output interface 112 to feed a transmitting port TxPn with a frame or block of frame for a transmission at a moment depending on the buffer that said frame or block of frame belongs to, and on the position of said frame or block of frame in the buffer.

Particular embodiments are now disclosed below.

Figure 4:
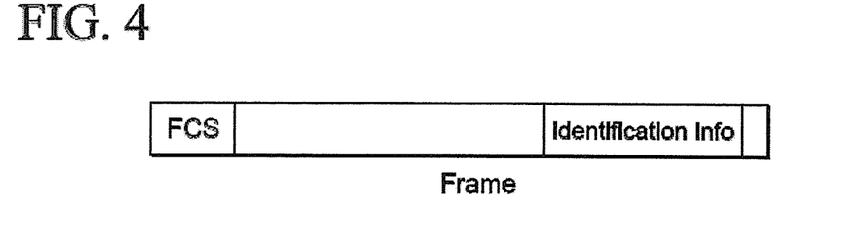
FIG. 4 shows a scheduled frame identification for performing a particular embodiment of the invention.

Referring now to FIG. 4, scheduled frames can be identified usually by the combination of a VLAN identifier and a priority level field, both located in the frame header. The combination of both these parameters can then be used to determine the traffic class that the scheduled frames belong to, and hence the queue where they are stored for transmission selection. Therefore, further to telecommunication data that the frame generally includes, as well as an FCS filed (for frame integrity checking), each frame has an information field which makes it possible to determine an index of priority for transmitting that frame.

Figure 5:
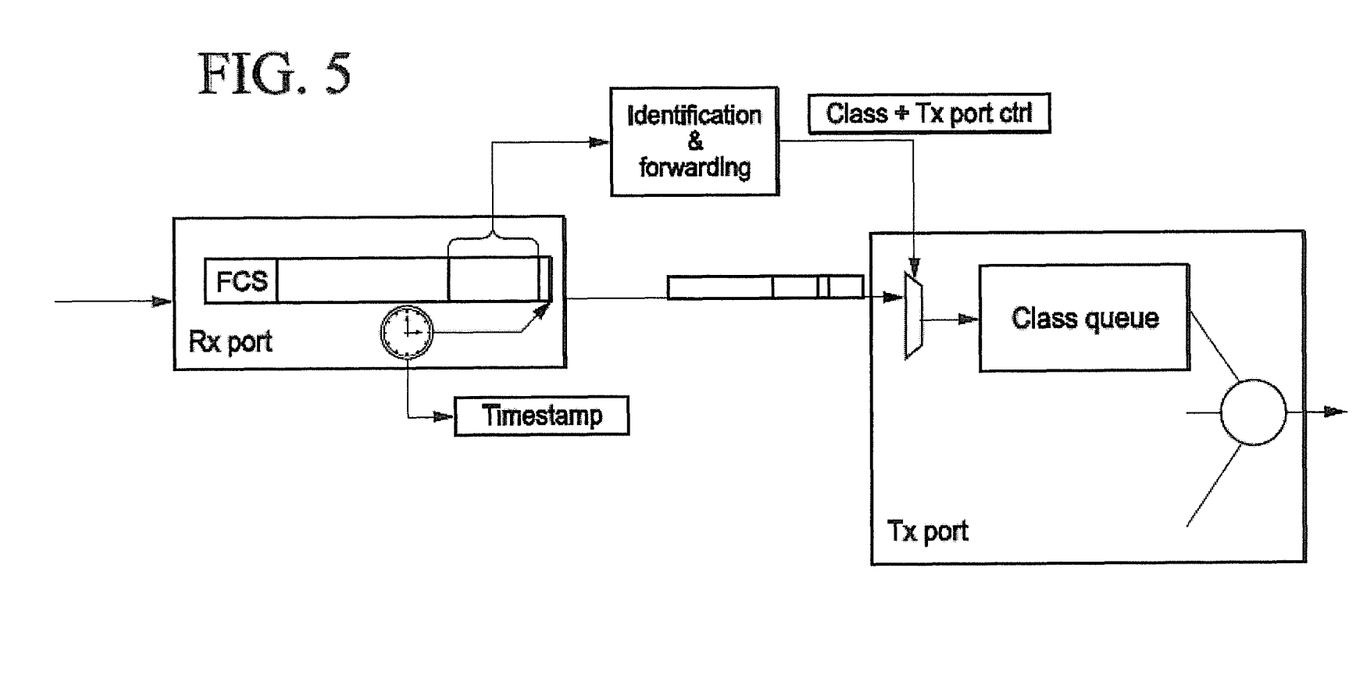
FIG. 5 shows a scheduled frames data path, in a store-and-forward mode, as an explanatory example of embodiment.

FIG. 5 shows thus a more complete data path of the scheduled frames. In this example of embodiment, scheduled frames are time-stamped upon reception of their first byte in the reception port. This makes it possible to order the frame in the buffer corresponding to its class. The timestamp is then associated with the frame data and both are communicated to the suitable transmission ports (Tx ports). Suitable transmission ports can be determined upon reading the frames. For example, the identification forwarding module can read a header field of the frame so as to determine whether the frame is to be broadcasted by all the transmission ports, or should rather be transmitted by several designated ports for a multicast transmission, or rather by a particular transmission port (for a unicast transmission), etc.

The application of the timestamps can be performed by the frame identification and forwarding module 10, or, as a variant, by the receiving port Rx. The receiving port Rx can also be in charge of providing input information extracted from the incoming frames to the frame identification and forwarding module 10.

Figure 6:
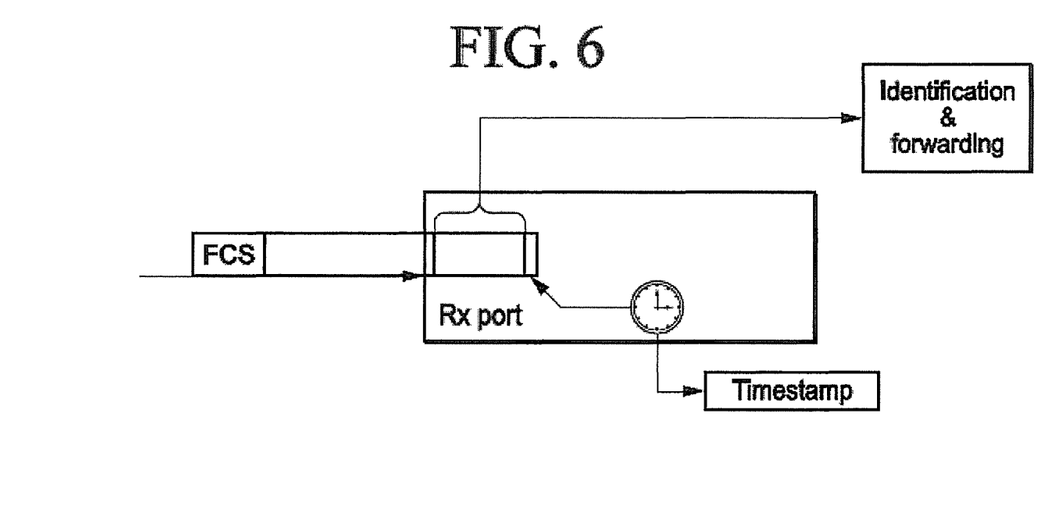
FIG. 6 shows an alternative embodiment of FIG. 5, namely a "cut-through frame forwarding"

Besides, two modes of reception operation are possible in the Rx port:

Store-and-forward mode (FIG. 5): received frame data is stored in a reception buffer (of memory 12 for example) to check the frame FCS (frame integrity check) before interrogating the Frame identification and forwarding module 10 and forwarding the frame to the Transmission port(s), Cut-through mode (FIG. 6): as soon as the data required to identify the received frame is present in a Rx port, the frame data is transferred to the specified class queue in the Transmission port(s) (in corresponding buffers), according to the decision of the Frame identification and forwarding module 10. As shown in FIGS. 5 and 6, the Frame identification and forwarding module 10 uses the frame data provided by the Rx port to determine the Tx port each frame is intended to, as well as the traffic class of the frame. This information is used to control the storage of the frame in the selected transmit Class queue.

Figure 7:
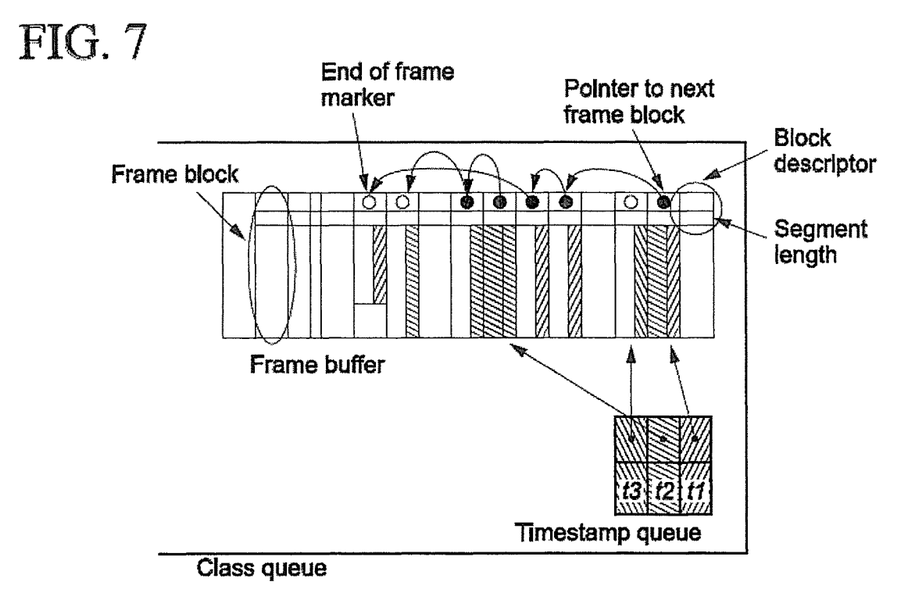
FIG. 7 shows class queue data structures for performing an embodiment of the invention.

The Class queues are arranged as frame buffers, which can be written with frame data coming from the Rx ports and read to provide the frame data to be transmitted over the Tx port that the Class queue belongs to.

Each Class queue is a dual-ported memory organised in frame blocks. Each frame block can contain a whole frame or a segment of a frame. Frame segmentation method within the context of the invention can be as disclosed in document EP 15305221.2 in the name of the applicant. This embodiment is shown in FIG. 7. Each block is associated to a block descriptor. The block descriptor contains a length field and a pointer field. The length field indicates the actual length of the frame data store in the frame block. The pointer field contains either a pointer to the next frame block containing a segment of the same frame or an "end-of-frame" marker if the frame block contains a whole frame or the last segment of a frame.

The Class queue also embeds a Timestamp queue that stores the timestamps associated with each frame stored in the Frame buffer, sorted in increasing order of their value. Each time a new frame is stored in the Frame buffer, the Time stamp queue's elements are sorted.

The transmission port reads the Class queues according to the transmission selection mechanism described in 802.1Qbv.

A Class queue is selected for transmission (i.e. read) when the corresponding 802.1Qbv gate is open, as known from the 802.1Qbv standard which is not disclosed here again.

The read order of the frames in the selected Class queue is given by the order of their associated timestamps, according to the main principle of the invention.

Figure 9:
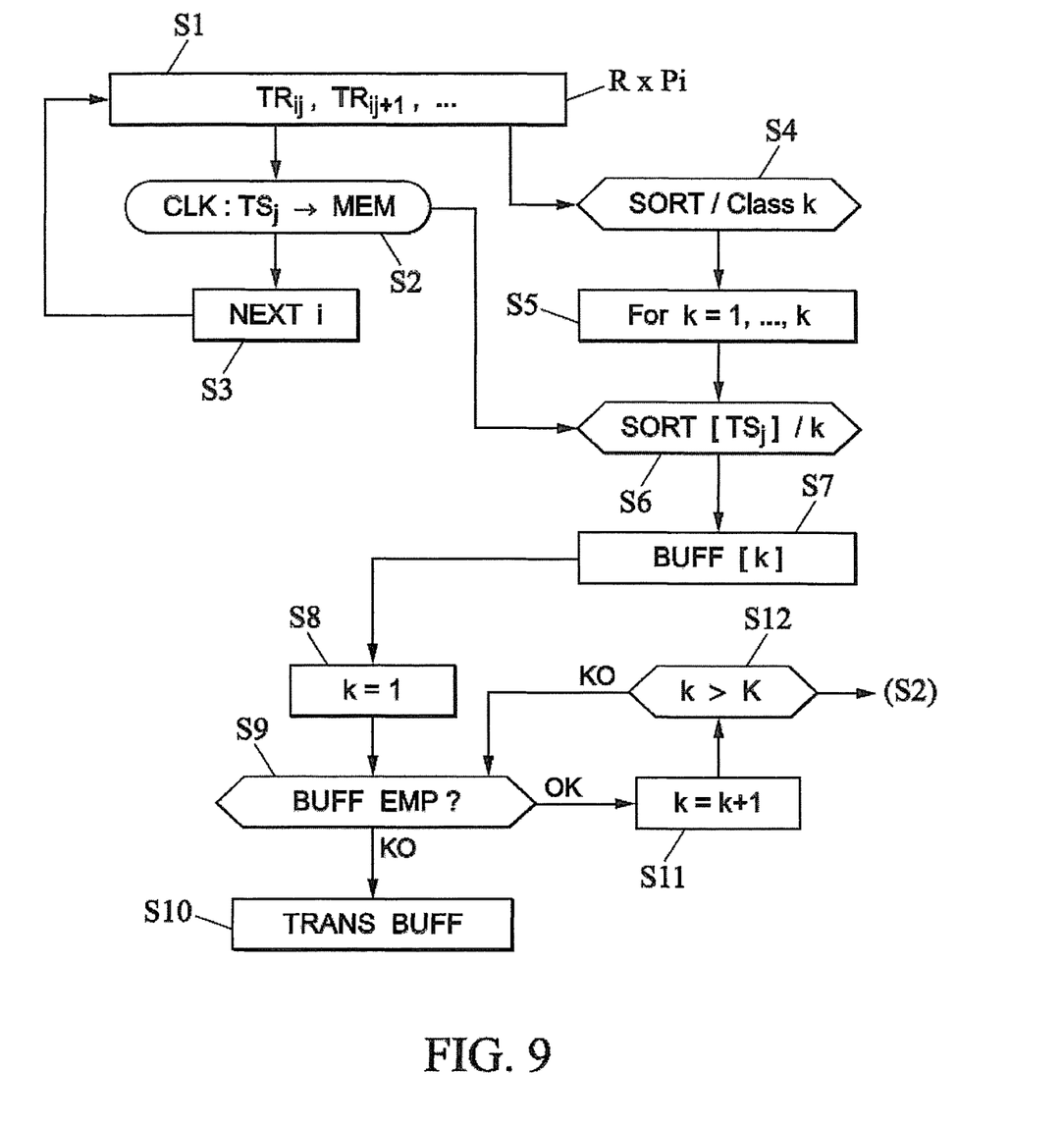
FIG. 9 shows an example of algorithm for performing the method according to an embodiment of the invention.

FIG. 9 is a flow chart representing a possible algorithm of a computer program according to an aspect of the invention. In step S1, frames TRij, TRij+1, etc. are successively received in each receiving port RxPi (step S3), and are stored with their respective timestamps TSj in step S2. In step S4, the frames are sorted according to their class (after reading the index of priority for transmission). Therefore, for each transmitting port, K buffers are built (in step S5) and in each buffer k (with k=1 to K), the frames (or blocks of frames) are sorted according to the respective frames timestamps in step S6. In a possible explanatory embodiment, if the buffers are filled in step S7, the priority for transmission is granted to the buffer corresponding to class 1 (k=1 in step S8). More particularly, in an embodiment, if the buffer is not empty in step S9, then the frames it contains are transmitted in step S10. Otherwise, the next class buffer content (k=2, in step S11) is checked so as to transmit the frames it contains, and so on, until k=K (step S12). In a possible embodiment, when all the buffers are completely filled with frames, a particular priority policy can be implemented. For example, the length of the buffers can be different: the higher class buffers can be longer so as to give priority to transmit higher class frames, before transmitting lower class frames.

Of course, assigned time windows for transmission moments which depend on the scheduled frame class can further rule the transmission of the frames in each buffer according to the standard IEEE 802.3br standard as explained above.

More particularly, priorities are given for transmission of express frames in the buffers of upper classes, within cyclic time windows. Frames or fragments of frames (called "blocks" above) of lower classes' buffers can be transmitted in the remaining time between two time windows. However, in the possible embodiment of FIG. 9, advantage can be taken in the use of buffers having predetermined lengths, as explained above, so as to allow also transmission of lower classes frames when the buffers of upper classes are temporally empty. More particularly, in a possible embodiment, the lengths of the upper classes' buffers at least can be adapted to the duration of the cyclic time windows.

Therefore, the present invention can be embedded in a computer program product (an algorithm of which is described above with reference to FIG. 9), which comprises all the features enabling the implementation of the methods described herein, and which, when loaded in an information processing system (for example a user equipment or a network element), causes the information processing system to carry out the invention. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

The invention claimed is:

1. A method for multiplexing data frames, in a packet-switched type network,
    at least a part of said network comprising one or several switches having:
        a first plurality of receiving ports, receiving said data frames, and
        a second plurality of transmitting ports, for transmitting at least blocks of said data frames,
    each frame including a data field comprising information related to an index of priority for transmitting the frame,
    wherein a clock is provided to said switches so as to apply a timestamp of reception of each frame in each receiving port, and a memory medium is further provided so as to store transitorily each received frame along with its timestamp,
    and wherein the method comprises:
    a) providing a plurality of memory buffers, associated to respective indexes of priority, each, buffer comprising one queue of frames having a same index of priority, wherein each queue is related to an associated traffic class in a multiplex of switch transmission ports,
    b) sorting the received frames in a chosen buffer according to their index of priority,
    c) in each buffer, sorting, the frames according to their respective timestamps, for ordering the queue of frames in each buffer from the earliest received frame on top of the queue to the latest received frame at the bottom of the queue, and
    d) feeding the transmitting ports with each frame or block of frame to transmit, in an order determined according to the index of priority of the frame, as well as an order of the frame or of the block of frame in the queue associated to the index of priority of the frame, wherein assigned time windows are reserved for transmission of frames or blocks of respective traffic classes and within a same transmission time window, priority for transmission is give to a frame or block received at a first in a reception port.

2. The method according to claim 1, wherein steps a) to c) are carried out for each transmitting port, and in step d), a given transmitting port is fed with successive frames or blocks of frame to transmit, in an order determined according to the index of priority of the frame for the given transmitting port, as well as an order of the frame or of the block of frame in the queue associated to the index of priority of the frame.

3. The method according to claim 1, wherein frames or blocks of a given buffer associated to a given priority index are transmitted when the transmission of all the buffers associated to priority indexes which are higher than the given index is completed.

4. The method according to claim 3, wherein each buffer is emptied after transmission of the frames or blocks it contains, and wherein each buffer has a maximum length for storing a predetermined maximum number of frames.

5. The method of claim 4, wherein, in step d):
   d1) all the frames or blocks of frames of a same given buffer are successively transmitted at once,
   d2) then, all the frames or blocks of frames of buffers associated to lower priority indexes are successively transmitted,
   d3) then, the content of each buffer is replaced by newly received frames or blocks of frames.

6. The method of claim 5, wherein a temporary memory is used for storing newly received frames during transmission steps d1) and d2) of previous frames or blocks.

7. The method according to claim 1, wherein said blocks result from a predetermined fragmentation of a given frame so as to transmit each block separately.

8. The method according to claim 1, wherein the network is an Ethernet network according to IEEE 802.1Qbv standard.

9. The method of claim 1, wherein said clock is used in transmitting ports so as to control timing of transmission operations within said time windows.

10. A network system comprising several receiving ports and several transmitting ports, comprising a clock counter, a memory medium and a network processing device for performing the method according to claim 1.

11. A network processing device for performing the method according to claim 1, comprising:
   an input interface to receive frames received over several receiving ports,
   a processing circuit receiving a clock input so as to apply a timestamp to each received frame,
   a link with a memory cooperating with the processing circuit so as to store transitorily each frame in a buffer corresponding to an index of priory of transmission of that frame, and in an order in the buffer corresponding to the timestamp of that frame, and
   an output interface to feed a transmitting port with a frame or block of frame for a transmission at a moment depending on the buffer that said frame or block of frame belongs to, and on the position of said frame or block of frame in the buffer.

* * * * *